United States Patent [19]

Taniguchi et al.

[11] Patent Number: 5,598,338
[45] Date of Patent: Jan. 28, 1997

[54] DEVICE FOR DETECTING THE EXISTENCE OF MOVING BODIES IN AN IMAGE

[75] Inventors: Hiroyasu Taniguchi; Haruki Furusawa; Jun Hatakenaka; Akinobu Seki, all of Amagasaki, Japan

[73] Assignee: Mitsubishi Denki Kabushiki Kaisha, Tokyo, Japan

[21] Appl. No.: 375,552

[22] Filed: Jan. 19, 1995

Related U.S. Application Data

[62] Division of Ser. No. 201,267, Feb. 24, 1994, Pat. No. 5,396,283, which is a division of Ser. No. 852,652, Mar. 17, 1992, Pat. No. 5,313,295.

[30] Foreign Application Priority Data

| Mar. 19, 1991 | [JP] | Japan | 3-54281 |
| Mar. 26, 1991 | [JP] | Japan | 3-61964 |
| Jun. 28, 1991 | [JP] | Japan | 3-158300 |
| Nov. 21, 1991 | [JP] | Japan | 3-06295 |

[51] Int. Cl.$^6$ .................................................. G06F 19/00
[52] U.S. Cl. ............................................ 364/436; 348/149
[58] Field of Search ................................... 364/436, 437, 364/438; 348/135, 142, 148, 149

[56] References Cited

U.S. PATENT DOCUMENTS

| 3,590,151 | 6/1971 | Keith | 178/6.8 |
| 4,709,264 | 11/1987 | Tamura et al. | 358/107 |
| 4,715,772 | 12/1987 | Kanayama | 358/107 |
| 4,742,389 | 5/1988 | Schiffman | 358/103 |
| 4,876,694 | 10/1989 | Schiffman | 358/103 |
| 4,912,770 | 3/1990 | Seto et al. | 358/105 |
| 5,046,120 | 9/1991 | Bishop | 385/54 |
| 5,121,200 | 6/1992 | Choi | 358/103 |
| 5,223,907 | 6/1993 | Asayama | 348/118 |
| 5,253,050 | 10/1993 | Karasudani | 348/118 |
| 5,313,295 | 5/1994 | Taniguchi et al. | 348/149 |
| 5,396,283 | 3/1995 | Taniguchi et al. | 348/149 |

FOREIGN PATENT DOCUMENTS

| 0403193 | 12/1990 | European Pat. Off. |
| 88/06326 | 8/1988 | WIPO |

OTHER PUBLICATIONS

Traffic Flow Measurement System Using Image Processing—Systems and Computers in Japan, Jan. 1986.
Measurement of Two–Dimensional Movement of Traffic by Image Processing, by Kopbatake et al. IEEE, 1987, pp. 14.17.1–14.17.4.
A Study on The Measurement of Two–dimensional Movement of Traffic, by Inoue et al, the 17th Image Technology Conference 16–13, 1986, pp. 295–298.

Primary Examiner—Collin W. Park
Attorney, Agent, or Firm—Wolf, Greenfield & Sacks, P.C.

[57] ABSTRACT

A moving body measuring device, having an image taking unit for taking an image of a moving body, a controllers for controlling the image taking unit and a frame memory for memorizing an image data of the image of the image taking unit, which processes the image data, detects the moving body and obtains an information of the moving body which comprises an existence domain setting circuits for previously setting an existence domain of the moving body extended along a moving path of the moving body based on the image data, a sampling circuits for sampling a data showing the moving body based on the image data in the existence domain, and a timewise data accumulating circuits for timewisely and continuously accumulating at every constant period, the data showing the moving body sampled by the sampling circuits which detects a timewise change of the moving body moving in the previously set existence domain.

19 Claims, 11 Drawing Sheets

DEVICE FOR DETECTING THE EXISTENCE OF MOVING BODIES IN AN IMAGE

This application is a division of application Ser. No. 08/201,267 filed Feb. 24, 1994, now U.S. Pat. No. 5,396,283, which is a division of application Ser. No. 07/852,652 filed on Mar. 17, 1992, now U.S. Pat. No. 5,313,295.

BACKGROUND OF THE INVENTION

This invention relates to a moving body measuring device for detecting state quantities of a moving body, and particularly to an image processing device for measuring traffic flows for detecting state quantities such as a traffic amount, a speed, an inter-vehicle distance, a density, an occupancy ratio, a traffic jam length, and a time required for passing a specified interval in automobile traffic flows.

As one of the moving body measuring devices, a development has been performed for the image processing device for measuring traffic flows, utilizing a TV camera, and measuring a traffic information of vehicles. FIG. 20 is a block diagram showing construction of a conventional image processing device for measuring traffic flows described in "A study on the measurement of two-dimensional movement of traffic" by Inoue et al, the proceedings of the 17th Image Technology Conference (1986), 16-13, p.p. 295 to 298. In FIG. 20, a reference numeral 1 designates an image taking machine, for instance, a TV camera, 2, a TV camera controlling circuit for controlling the TV camera 1, 3, a frame memory for receiving digitized image signals, 4, a window setting circuit for setting a sampling area of a vehicle, 5, a vehicle detecting circuit, 6, a vehicle running position detecting circuit, 7, a vehicle moving amount detecting circuit, and 8, a vehicle information measuring circuit.

Next, explanation will be given to the operation. The TV camera 1 takes an image of a running vehicle at an arbitrary frame interval, controlled by the TV camera controlling circuit 2. The frame memory 3 receives data digitized from image signals of the TV camera 1. The window setting circuit 4 sets a window of a size of a vehicle on a road, on a screen. The vehicle detecting circuit 5 detects the vehicle by sampling a characteristic of the vehicle such as a horizontal line or a vertical line thereof based on a domain set by the window setting circuit 4. The vehicle running position detecting circuit 6 detects a running position of the vehicle detected by the vehicle detecting circuit 5, on the screen, and the vehicle moving amount detecting circuit 7 compares the running position with another running position of the vehicle in a preceding frame, detects a moving amount of the vehicle on the screen, and transmits it to the window setting circuit 4. The window setting circuit 4 moves the window according to the moving amount. The vehicle is tracked by repeating the above operation. The tracking is finished at the time point when the vehicle is out of the screen, and the vehicle information measuring circuit 8 measures the speed of the vehicle, the inter-vehicle distance between the vehicle and a foregoing vehicle and the like.

Since the conventional moving body measuring device or the image processing device for measuring traffic flows, is composed as above, an inter-frame tracking treatment is necessary and, therefore, the construction is complicated. Furthermore, when the vehicle detecting cannot be performed by a noise or an influence of the other vehicles, the device can not track the vehicle, and the measuring accuracy is deteriorated. Furthermore, when there are a plurality of vehicles on the screen, the conventional device can only track a single vehicle.

Furthermore, the conventional moving body measuring device is constructed to detect the vehicle by sampling a spatial characteristic of the vehicle on the screen image such as the horizontal line or the vertical line. Therefore, the sampling of the vehicle cannot be performed adequately when a noise such as a horizontal line or a vertical line of a road surface pattern or a tire mark, is introduced in the background of the window, and a successive measuring treatment is in failure.

SUMMARY OF THE INVENTION

It is an object of the present invention to solve above problems. It is an object of the present invention to provide a moving body measuring device or an image processing device for measuring traffic flows capable of dispensing with referring to a moving body for tracking between respective frames, being simple in the construction, capable of sampling the vehicle even when the vehicle information partially drops off in some frames, the measuring accuracy thereof being high, capable of detecting a plurality of moving bodies simultaneously existent on the screen, and capable of accurately detecting an abnormality of traffic flows due to an accident or the like.

It is an object of the present invention to provide a moving body detecting device capable of detecting a moving body such as a vehicle accurately and efficiently by enhancing a separation capability of a detected body from a stationary object background, utilizing a change of a brightness information of a moving body on its time axis.

According to a first aspect of the present invention, there is provided a moving body measuring device, having an image taking unit for taking an image of a moving body, a controlling means for controlling the image taking unit and a frame memory for memorizing an image data of the image of the image taking unit, which processes the image data, detects the moving body and obtains an information of the moving body which comprises:

an existence domain setting means for previously setting an existence domain of the moving body extended along a moving path of the moving body based on the image data;

a sampling means for sampling a data showing the moving body based on the image data in the existence domain; and a timewise data accumulating means for timewisely and continuously accumulating at every constant period, the data showing the moving body sampled by the sampling means which detects a timewise change of the moving body moving in the previously set existence domain.

According to a second aspect of the present invention, there is provided a moving body measuring device according to the first invention, further comprising a binarizing means for forming a two-dimensional binary data by preforming a binarizing of the timewisely accumulated image data obtained by the timewise data accumulating means; and a hole-filling means for converting a binary data juxtaposed with a reference data being perpendicular to a predetermined direction of the reference data into the same data with the reference data when data juxtaposed on both sides of the reference data in the predetermined direction are the same binary data with the reference data among the image data binarized by the binarizing means.

According to a third aspect of the present invention, there is provided a moving body measuring device according to the first invention, further comprising; a binarizing means for forming a two-dimensional binary data by performing a binarizing of the timewisely accumulated image data obtained by the timewise data accumulating means; and a line component element sampling means for sampling a line component element as a reference binary data when first binary data having the same value with that of the reference binary data are continuously arranged in a predetermined direction of the reference binary data on one side of the reference binary data, and second binary data having a different value with that of the reference binary data are continuously arranged in the predetermined direction on the other side of the reference binary data, among the image data binarized by the binarizing means.

According to a fourth aspect of the present invention, there is provided a moving body measuring means having an image taking unit for taking an image of a moving body, a controlling means for controlling the image taking unit and a frame memory for memorizing an image data of the image of the image taking unit, which processes the image data, detects the moving body and obtains an information of the moving body which comprises:

an existence domain setting means for previously setting an existence domain of the moving body extended along a moving path of the moving body based on the image data;

a sampling means for sampling a data showing the moving body based on the image data in the existence domain;

a timewise data accumulating means for timewisely and continuously accumulating at every constant period, the data showing the moving body sampled by the sampling means;

a binarizing means for forming a two-dimensional binary data by performing a binarizing of the timewisely accumulated data obtained by the timewise data accumulating means;

an image data projecting means for forming a projected data by one-dimensionally projecting the image data binarized by the binarizing means;

an area calculating means for calculating an area occupied by elements of a first logic of "1" or a second logic of "0" by counting a summation of the elements of the first logic of "1" or the second logic of "0" among the image data binarized by the binarizing means; and a moving body monitoring means for detecting a timewise change of the moving body moving in the previously set existence domain by using the projected data obtained by the image data projecting means and the area obtained by the area calculating means, and issuing an alarm when the timewise change of the moving body is characteristic.

According to a fifth aspect of the present invention, there is provided a moving body measuring device according to the fourth invention, further comprising; a situation confirming means for continuously monitoring the timewise change of the moving body after a characteristic change is observed in the timewise change of the moving body and the alarm is issued by the moving body monitoring means and issuing a secondary alarm when the timewise change of the moving body is characteristic.

According to a sixth aspect of the present invention, there is provided a moving body measuring device which comprises:

an image taking unit for taking an image of a moving body;

a signal converting unit for converting an image signal of the image taking unit into a numerical value corresponding with a gray level value;

a frame memory for recording the gray level value at an address corresponding with time and a spatial coordinate in a plurality of successive scenes; and a calculating unit for detecting existence or nonexistence of the moving body by performing a multiplying sum calculation with respect to respective points memorized in the frame memory, between a plurality of the gray level values at a plurality of time points in vicinity and in a spatial vicinity of the respective points, and a previously set plurality of constant-valued weight coefficients.

According to a seventh aspect of the present invention, there is provided a moving body measuring device which comprises:

an image taking unit for taking an image of a moving body;

a signal converting unit for converting an image signal into a numerical value corresponding with a gray level value;

a first frame memory for recording the gray level value at an address corresponding with a space-time coordinate in a plurality of successive scenes;

a first calculating unit for detecting a timewise change of the gray level value in a space, by performing a multiplying sum calculation with respect to respective points memorized in the first frame memory, between a plurality of the gray level values at a plurality of time points in vicinity and in a spatial vicinity of the respective points, and a previously set plurality of constant-valued weight coefficients;

a second frame memory separately provided for recording an output value of the first calculating unit in the plurality of successive scenes, at an address corresponding with a space-time coordinate; and a second calculating unit for detecting existence or nonexistence of the moving body by changes of the output values at the same spatial coordinate corresponding with a plurality of time points in the second frame memory.

According to an eighth aspect of the present invention, there is provided an image processing device for measuring traffic flows which comprises:

a TV camera for taking an image of a vehicle;

a TV camera controlling circuit for controlling the TV camera;

a frame memory for memorizing an image data of the TV camera;

an existence domain setting means for previously setting an existence domain of the vehicle extended along a moving path of the vehicle based on the image data;

a sampling means for sampling a data showing the vehicle based on the image data in the existence domain;

a timewise data accumulating means for timewisely and continuously accumulating at every constant period, the data showing the vehicle sampled by the sampling means;

a vehicle determining means for determining existence of the vehicle moving in the previously set existence domain; and a state quantities measuring means for measuring state quantities of the vehicle determined by the vehicle determining means.

According to a ninth aspect of the present invention, there is provided an image processing device for measuring traffic flows according to the eighth invention, further comprising; a binarizing means for forming a two-dimensional binary data by performing a binarizing of the timewisely accumulated image data obtained by the timewise data accumulating means; and a hole-filling means for converting a binary data juxtaposed with a reference data being perpendicular to a predetermined direction of the reference data into the same data with the reference data when data juxtaposed on both sides of the reference data in the predetermined direction are the same binary data with the reference data among the image data binarized by the binarizing means.

According to a tenth aspect of the present invention, there is provided an image processing device for measuring traffic flows according to the eighth invention, further comprising; a binarizing means for forming a two-dimensional binary data by performing a binarizing of the timewisely accumulated image data obtained by the timewise data accumulating means; and a line component element sampling means for sampling a line component element as a reference binary data when first binary data having the same value with that of the reference binary data are continuously arranged in a predetermined direction of the reference binary data, on one side of the reference binary data and second binary data having a different value with that of the reference binary data are continuously arranged in the predetermined direction on the other side of the reference values data, among the image data binarized by the binarizing means.

According to an eleventh aspect of the present invention, there is provided an image processing device for measuring traffic flows which comprises:

a TV camera for taking an image of a vehicle;

a TV camera controlling circuit for controlling the TV camera;

a frame memory for memorizing an image data of the TV camera;

an existing domain setting means for previously setting an existence domain of the vehicle extended along a moving path of the vehicle based on the image data;

a sampling means for sampling a data showing the vehicle based on the image data in the existence domain;

a timewise data accumulating means for timewisely and continuously accumulating at every constant period, the data showing the vehicle sampled by the sampling means;

a binarizing means for forming a two-dimensional binary data by performing a binarizing of the timewisely accumulated data obtained by the timewise data accumulating means;

an image data projecting means for forming a projected data by one-dimensionally projecting the image data binarized by the binarizing means;

an area calculating means for calculating an area occupied by elements of a first logic of "1" or a second logic of "0" by counting a summation of the elements of the first logic of "1" or the second logic of "0" among the image data binarized by the binarizing means; and a traffic flow monitoring means for detecting a timewise change of a traffic flow of vehicles moving in the previously set existence domain by using the projected data obtained by the image data projecting means and the area obtained by the area calculating means, and issuing an alarm when the timewise change of the traffic flow is characteristic.

According to a twelfth aspect of the present invention, there is provided an image processing device for measuring traffic flows according to the eleventh invention further comprising; a traffic flow confirming means for continuously monitoring the timewise change of the traffic flow after a characteristic change is observed in the timewise change of the traffic flow and the alarm is issued by the traffic flow monitoring device and issuing a secondary alarm when the timewise change of the moving body is characteristic.

According to a thirteenth aspect of the present invention, there is provided an image processing device for measuring traffic flows which comprises:

a TV camera for taking an image of a vehicle;

a TV camera controlling circuit for controlling the TV camera;

a frame memory for memorizing an image data of the image of the vehicle;

an existence domain setting means for previously setting an existence domain of the vehicle extended along a moving path of the vehicle based on the image data;

a sampling means for sampling a data showing the vehicle based on the image data in the existence domain;

an attached information sampling means for sampling and preserving an information attached to the data sampled by the sampling means;

a vehicle data selecting means for selecting the data showing the vehicle sampled by the sampling means by referring to the data attached by the attached information sampling means;

a timewise data accumulating means for timewisely and continuously accumulating at every constant period, the data selected by the vehicle data selecting means;

a vehicle determining means for determining existence of a vehicle moving in the previously set existence domain based on the timewisely accumulated data obtained by the timewise data accumulating means; and a state quantities measuring device for measuring state quantities of the vehicle determined by the vehicle determining means.

According to a fourteenth aspect of the present invention, there is provided an image processing device for measuring traffic flows which comprises:

a TV camera for taking an image of a vehicle;

a TV camera controlling circuit for controlling the TV camera;

a frame memory for memorizing an image data of the image of the vehicle;

an existence domain setting means for previously setting an existence domain of the vehicle extended along a moving path of the vehicle based on the image data;

a sampling means for sampling a data showing the vehicle based on the image data in the existence domain;

an attached information sampling means for sampling and preserving an information attached to the data sampled by the sampling means;

a timewise data accumulating means for timewisely and continuously accumulating at every constant period, the data showing the vehicle sampled by the sampling means;

a vehicle determining means for determining existence of the vehicle moving in the previously set existence domain based on the timewise image data obtained by the timewise data accumulating means;

a vehicle motion detecting device for detecting a behavior of the vehicle by referring to the data obtained by the attached data accumulating means and the vehicle determining means; and a state quantities measuring means for measuring state quantities of the vehicle determined by the vehicle determining means.

In the drawings:

DETAILED DESCRIPTION

EXAMPLE 1

Figure 1:
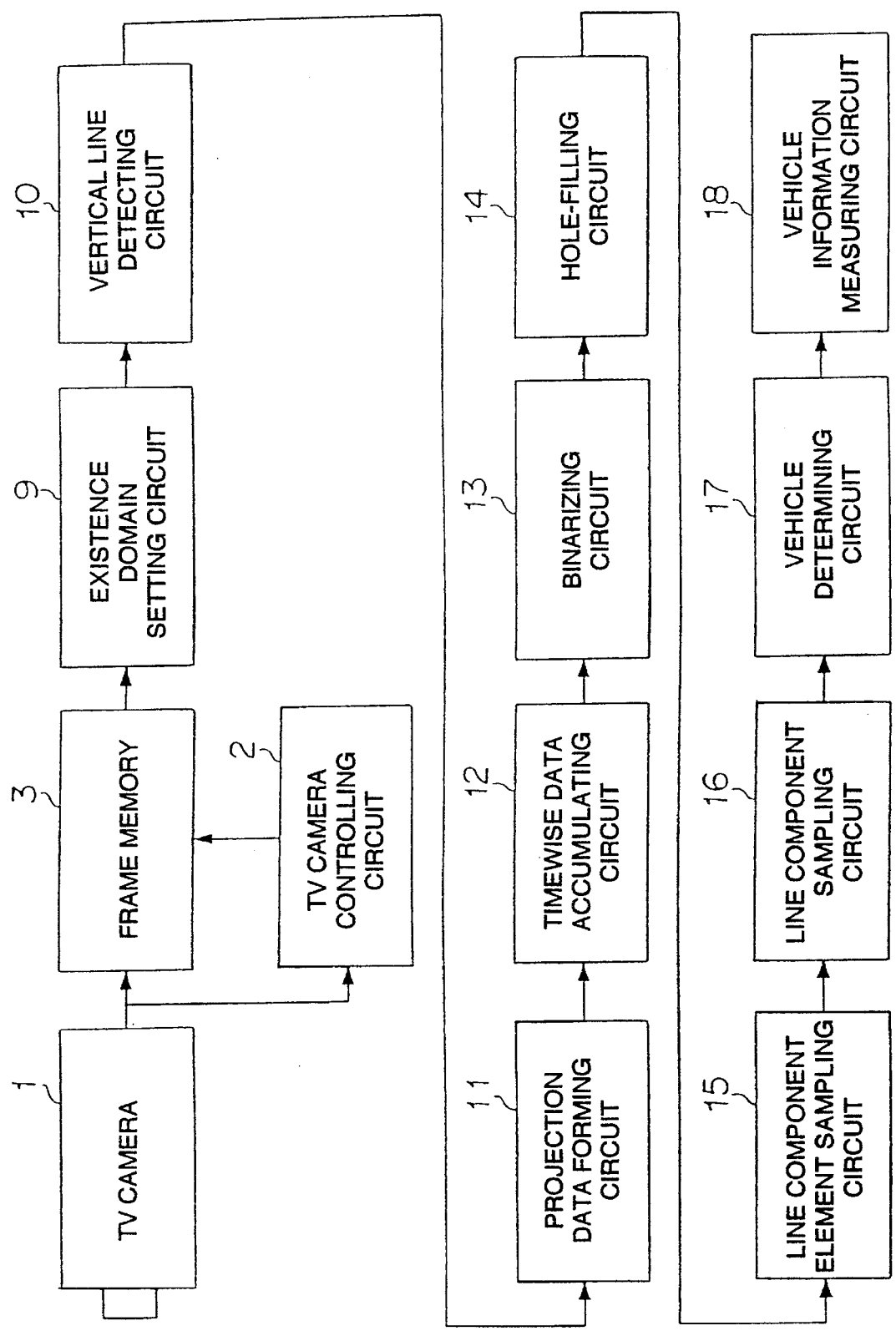
FIG. 1 is a block diagram showing an embodiment of construction of an image processing device for traffic flows according to the present invention.

FIG. 1 is a block diagram showing a first embodiment of construction of an image processing device for measuring traffic flows according to the present invention. In FIG. 1, a reference numeral 9 designates an existence domain setting circuit, 10, a vertical line detecting circuit, 11, a projection data forming circuit, 12, a timewise data accumulating circuit, 13, a binarizing circuit, 14, a hole-filling circuit, 15, a line component element sampling circuit, 16, a line component sampling circuit, 17, a vehicle determining circuit and 18, a vehicle information measuring circuit.

Figure 2:
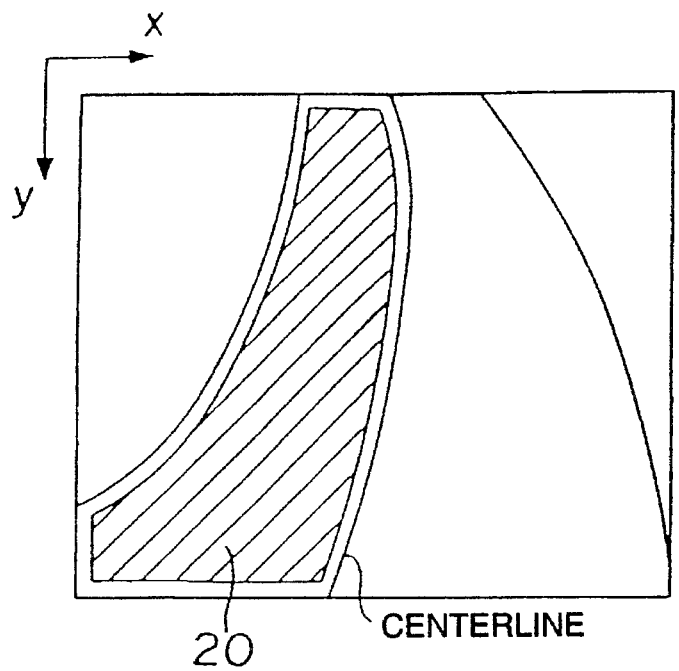
FIG. 2 is an explanatory diagram of an example of an existence domain in a first embodiment according to the present invention.
Figure 3:
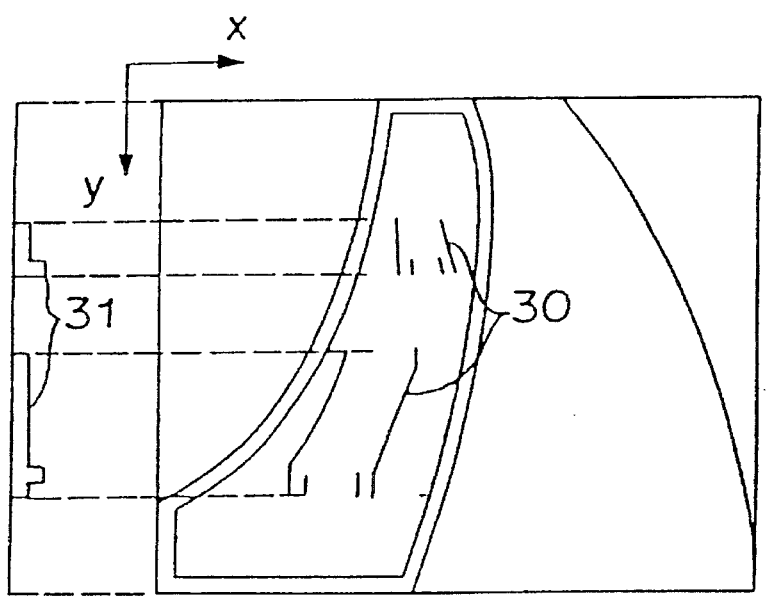
FIG. 3 is an explanatory diagram showing a vertical line edge data and a projection data in the first embodiment according to the present invention.
Figure 4:
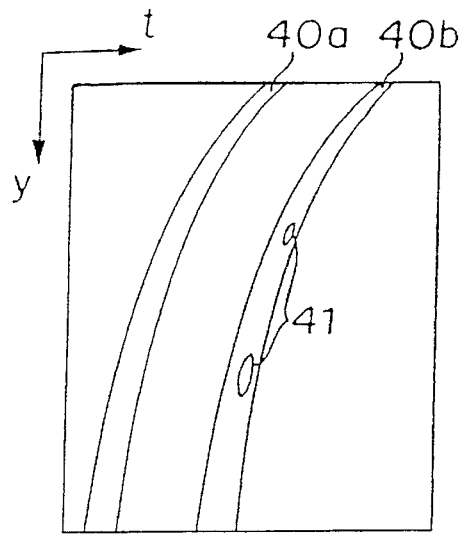
FIG. 4 is an explanatory diagram showing data formed into binary values of a timewisely accumulated data image in the first embodiment according to the present invention.

Next, explanation will be given to the operation. The TV camera 1 takes an image of a running vehicle at an arbitrary frame interval following the TV camera controlling circuit 2. The frame memory 3 receives data digitized from an image signal of the TV camera 1. This data is a two-dimensional image data, and hereinafter, the horizontal direction is x-direction, and the vertical direction, y-direction. The existence domain setting circuit 9 takes out data of an existence domain of the vehicle extended along a previously set moving path of the vehicle from the frame memory 3. FIG. 2 is an explanatory diagram showing an example of the existence domain set by the existence domain setting circuit 9 on the screen in which an image of a road is taken by the TV camera, wherein a reference numeral 20 designates the existence domain. The vertical line detecting circuit 10 takes out a vertical line edge from data in the existence domain, by utilizing, for instance, a vertical line detecting filter and the like. In this occasion, a vertical line edge data is produced wherein a domain in which the vertical line edge exists, is determined as 1, and the other domain, as 0. The projection data forming circuit 11 produces a one-dimensional projection data by projecting the vertical line edge data in x-direction, wherein the size in x-direction is 1, and the size in y-direction, the screen size. FIG. 3 is an explanatory diagram showing the vertical line edge data and the projection data, wherein a reference numeral 30 designates the vertical line edge data, and 31, the projection data. The projection data 31 is produced at a rate of one per one frame. The above treatment is repeated at every constant period. The timewise data accumulating circuit 12 timewisely accumulates the projection data 31 by a predetermined number, thereby forming a two-dimensional data. The binarizing circuit 13 forms this two-dimensional data into binary values by a pertinent threshold value Th0. FIG. 4 is an explanatory diagram showing the binary data, wherein the horizontal direction signifies time (hereinafter, t-direction), the vertical direction, y-direction and 40a and 40b, loci of the vehicle. In FIG. 4, time elapses from left to right.

Figure 5:
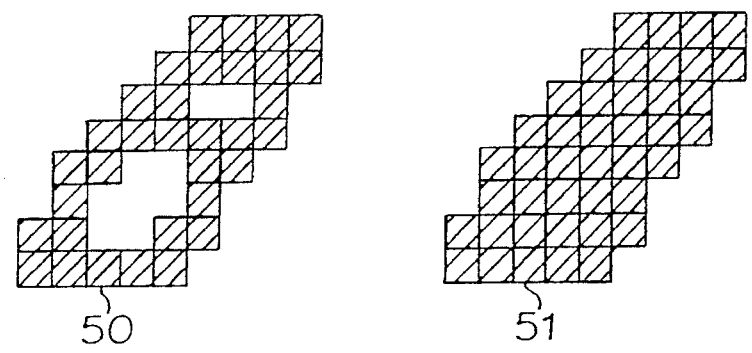
FIG. 5 is an explanatory diagram of a hole-filling method in the first embodiment according to the present invention.

In this binary data, holes designated by a reference numeral 41 are generated when the vertical line edge cannot be sampled by overlapping of the other vehicles or the like. The hole-filling circuit 14 performs hole-filling of the binary data by the following treatment. The operation accesses the binary data in y-direction from lower side to upper side, and in t-direction from left side or from right side, successively, and selects a reference data. When a condition is established wherein a value of the reference data is 1, and both of adjacent two data juxtaposed with the reference data in t-direction are 1, a value of a data above the reference data in y-direction is determined as 1. The operation performs nothing in case of conditions other than the above one. This operation is performed for every data. FIG. 5 is an explanatory diagram of the hole-filling method, wherein a reference numeral 50 designates a portion of binary data before the hole-filling, and 51, binary data as a result of performing the above hole-filling. In FIG. 5, the hatched portion designates the binary data having the value of 1, and the other portions, data having the value of 0.

Figure 6:
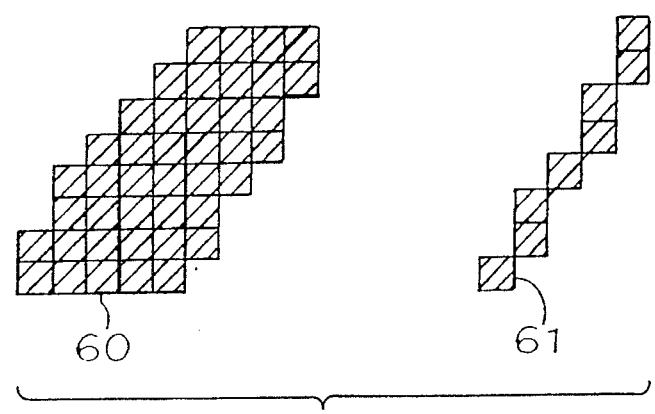
FIG. 6 is an explanatory diagram of a line component element sampling method in the first embodiment according to the present invention.

The line component element sampling circuit 15 produces data which becomes an element of a partial locus of the vehicle by the following treatment. The operation successively accesses the hole-filled binary data in y-direction from upper side or lower side and in t-direction from left side or right side, and selects a reference data. When a condition is established wherein the reference data is 1, data having the value of 1 are continuously arranged by a predetermined number in t-direction on the left-hand side of the reference data, and data having the value of 0 by a predetermined number on the right-hand side of the reference data, or wherein the reference data is 1, data having the value of 1 by a predetermined number in y-direction on the upper side of the reference data, are continuously arranged and data having the value of 0 by a predetermined number on the lower side of the reference data, are continuously arranged, the reference data is sampled out as the element of the line component. This operation is performed for every data. By this treatment, an outline on the right-hand side of a domain of 1 in binary data, is sampled out as the element of the line component. FIG. 6 is an explanatory diagram of the line component element sampling methods, wherein a reference numeral 60 designates a portion of the binary data, 61, a treatment result of the above line component element sampling, under a condition wherein there is one data having the value of 1 on the left-hand side of the reference data, and a data having the value of 0 on the right-hand side of the reference data. In FIG. 6, the hatched portion 60 designates data having the value of 1 in the binary data, and the hatched portion 61, data sampled out as the line component.

The line component sampling circuit 16 samples out the line component by connecting the elements of the line component. The vehicle determining circuit 17 performs a determination by a length of the line component or a position on the screen thereof, and samples out the line component for the vehicle. The vehicle information measuring circuit 18 measures the speed of the vehicle or the inter-vehicle distance between the vehicle and a preceding vehicle by utilizing a three-dimensional position information of a starting point and an end point of the line component which is sampled out as the vehicle.

Furthermore, in the above embodiment, the vertical line detecting circuit is provided for treating data in the existence domain. However, it can be substituted with any treatments which sample out the characteristic of the vehicle.

Furthermore, the binarizing circuit is provided after the timewise data accumulating circuit. However, it can be provided between the projection forming circuit and the timewise data accumulating circuit.

The hole-filling circuit is provided in this embodiment. However, it can be omitted when there is no lack of the vehicle information.

Furthermore, in the hole-filling circuit, the operation accesses the binary data in y-direction from the lower side to the upper side. However, the operation can access it from the upper side to the lower side. In that case, the operation performs a treatment wherein a data below the reference data in y-direction is converted to 1, when a condition is established wherein the reference data is 1, and the both two data juxtaposed with the reference data in t-direction are 1.

In the line component element sampling circuit, the operation utilizes a condition wherein the reference data is 1, data having the value of 1 by a predetermined number on the left-hand side of the reference data are continuously arranged and data having the value of 0 on the right-hand side of the reference data are continuously arranged by a predetermined number, or wherein the reference data is 1, data having the value of 1 by a predetermined number on the upper side of the reference data in y-direction, are continuously arranged, and data having the value of 0 on the lower side of the reference data, are continuously arranged by a predetermined number. However, the operation can utilize a condition wherein the reference data is 1, data having the value of 0 on the left-hand side of the reference data, are continuously arranged by a predetermined number and data having the value of 1 on the right-hand side of the reference data, are continuously arranged by a predetermined number, or wherein the reference data is 1, data having the value of 0 on the upper side of the reference data in y-direction, are continuously arranged by a predetermined number and data having the value of 1 on the lower side of the reference data, are continuously arranged by a predetermined number. In these cases, an outline on the left-hand side of the domain of 1 in the binary data, is sampled out as the element of the line component.

As for the value of the binary data, the value of 1 can be replaced with that of 0, and that of 0, with that of 1, with similar effect as in the above embodiment.

EXAMPLE 2

Figure 7:
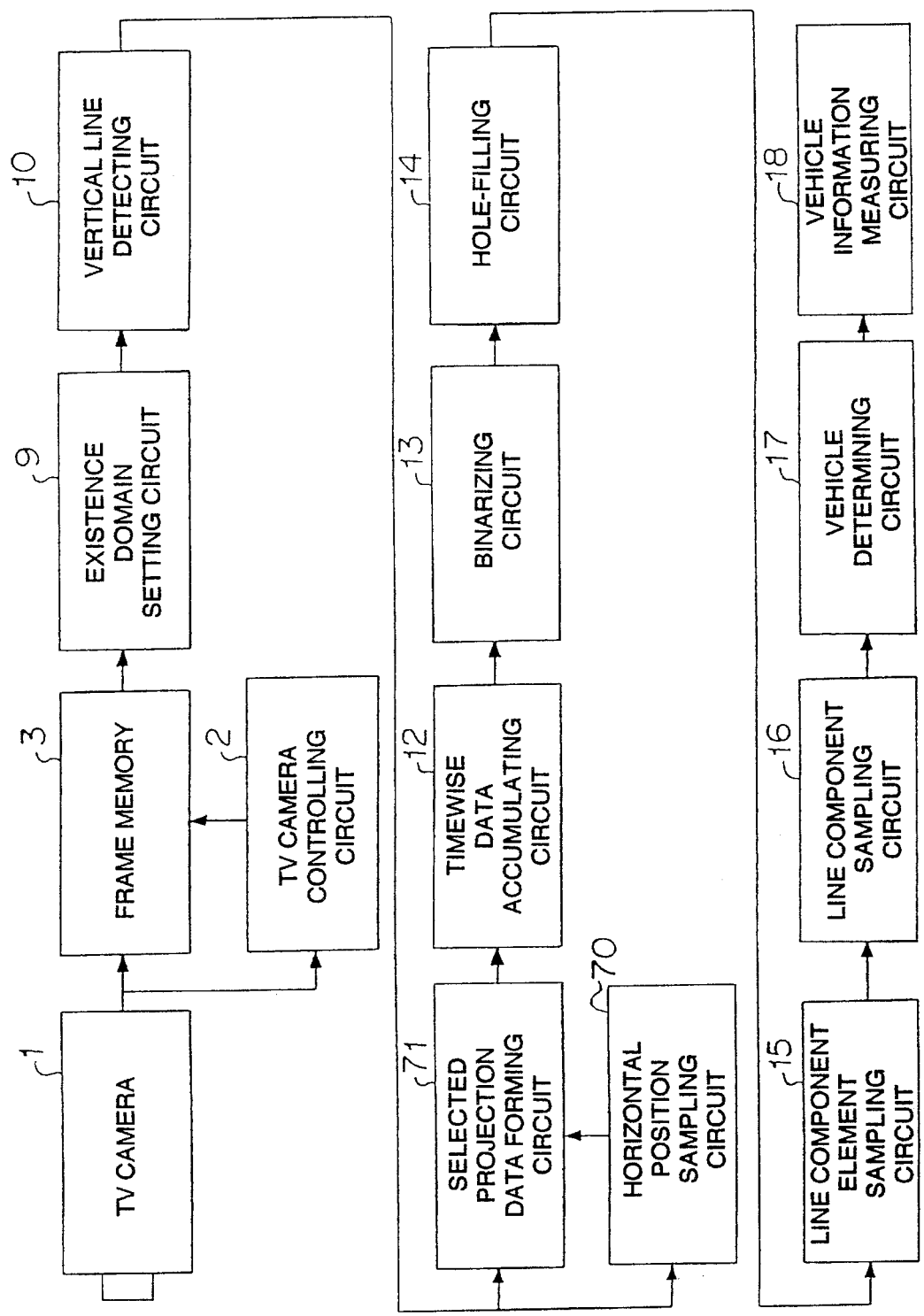
FIG. 7 is a block diagram showing a second embodiment of construction of an image processing device for traffic flows according to the present invention.

FIG. 7 is a block diagram showing a second embodiment of construction of an image processing device for traffic flows according to the present invention. In FIG. 7, a reference numeral 70 designates a horizontal position sampling circuit, and 71, a selected projection data forming circuit.

Next, explanation will be given to the operation. The TV camera 1 takes an image of a running vehicle at an arbitrary frame interval following the TV camera controlling circuit 2. The frame memory 3 receives data digitalized from the image signal of the TV camera 1. This data is a two-dimensional image data, and hereinafter, the horizontal direction is x-direction, and the vertical direction, y-direction. The existence domain setting circuit 9 takes out data of the existence domain of the vehicle extended along a previously set moving path of the vehicle from the frame memory 3. The vertical line detecting circuit 10 takes out a vertical line edge from data in the existence domain, by utilizing, for instance, a vertical line detecting filter or the like. As this occasion, a vertical line edge data is produced wherein a domain in which the vertical line edge is existent, is determined as 1, the other domains, as 0. The horizontal position sampling circuit 70 samples out a mean value (x center of gravity) of a horizontal position (x coordinate) of every vertical line edge on a horizontal line, for respective horizontal lines, a horizontal position of the vertical line edge existent on the far left-hand side on the horizontal line (far left point) and a horizontal position of the vertical line edge existent at far right-hand side on the horizontal line (far right point), and preserves these data. The selected projection data forming circuit 71 selects a horizontal line which satisfies a condition wherein the x center of gravity in the horizontal position is within a predetermined range, or a distance between the far left point and the far right point is a certain threshold value Th1 or more, by referring to data of the horizontal position sampling circuit 70, projects every vertical line edge data on the selected horizontal line in x-direction, and converts projection values of non-selected horizontal lines into 0, thereby producing a one-dimensional projection data wherein the x-direction size is 1 and the y-direction size is the screen size. The selection of the horizontal line is performed for sampling out data having high possibility of being the vertical line edge data of the vehicle as a sampling object. The projection data 31 is formed in a ratio of one per one frame. The above treatment is repeated at every constant period. The timewise data accumulating circuit 12 accumulates the projection data 31 timewisely by a predetermined number, thereby forming a two-dimensional data. The binarizing circuit 13, performs a binarizing of the two-dimensional data by a threshold value Th0. The hole-filling circuit 14 performs the hole-filling of the binarized two-dimensional data by a method shown in the first embodiment. The line component element sampling circuit 15 samples out data of elements of line components showing partially a locus of the vehicle based on the hole-filled two-dimensional data, by a method shown in the first embodiment. The line component sampling circuit 16 samples out the line component by connecting the elements of the line component. The vehicle determining circuit 17 performs a determination by a length of the line component or by a position thereof on the screen, thereby sampling out the line component for the vehicle. The vehicle information measuring circuit 18 measures a speed of the vehicle or an inter-vehicle distance between the vehicle and a foregoing vehicle or the like by utilizing a three-dimensional position information of a starting point and an end point of the line component sampled out as the vehicle.

EXAMPLE 3

Figure 8:
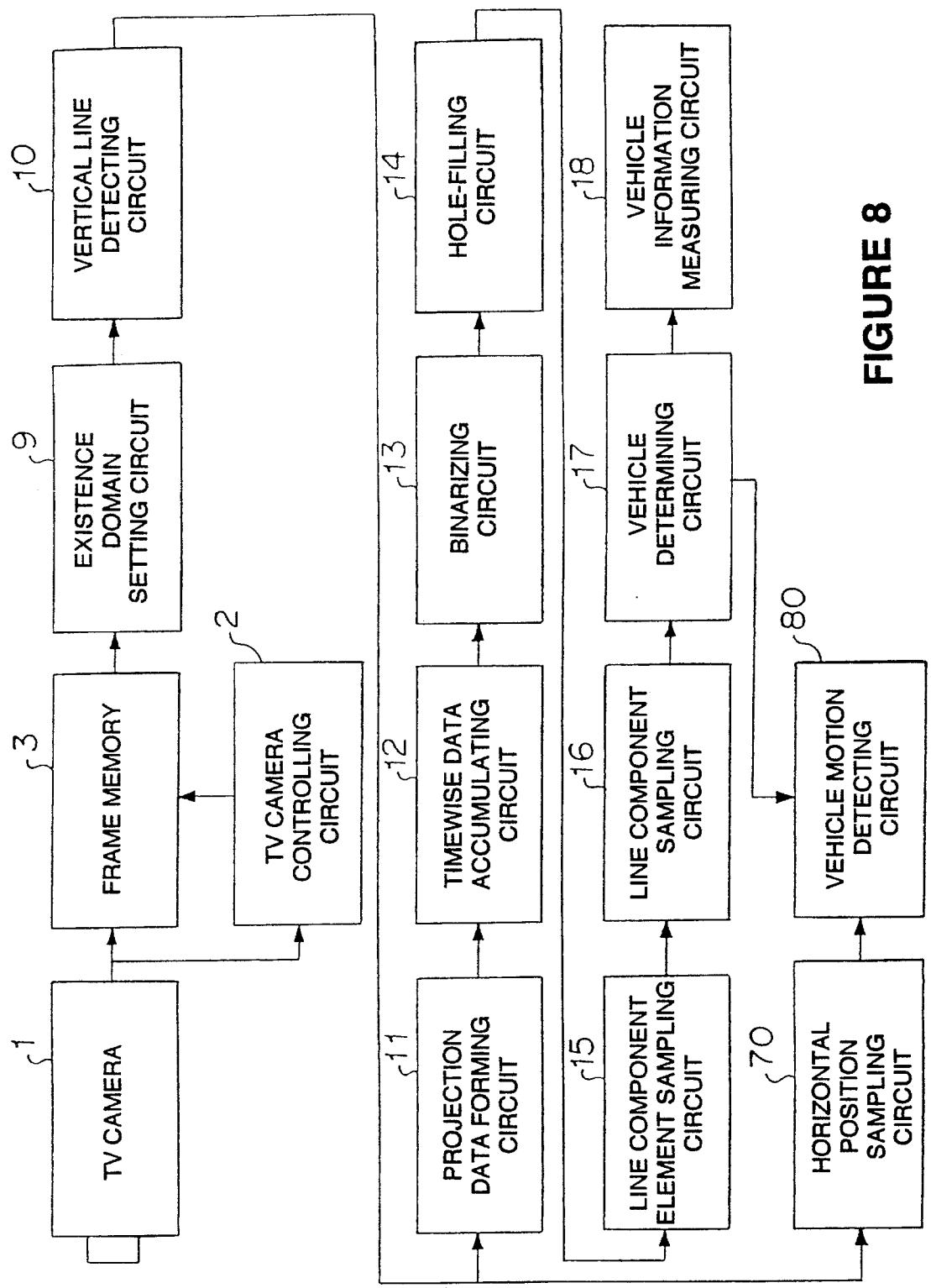
FIG. 8 is a block diagram showing a third embodiment of construction of an image processing device for measuring traffic flows according to the present invention.

FIG. 8 is a block diagram showing a third embodiment of construction of an image processing device for measuring traffic flows according to the present invention, wherein a reference numeral 80 designates a vehicle motion detecting circuit.

Next, explanation will be given to the operation. The TV camera 1 takes an image of a running vehicle at an arbitrary frame interval following the TV camera controlling circuit 2. The frame memory 3 receives data digitalized from the image signal of the TV camera 1. This data is a two-dimensional image data, and hereinafter, the horizontal direction is x-direction, and the vertical direction, y-direction. The existence domain setting circuit 9 takes out data of the existence domain of the vehicle extended along a previously set moving path of the vehicle from the frame memory 3. The vertical line detecting circuit 10 takes out the vertical line edge by utilizing, for instance, a vertical line detecting filter or the like from data in the existence domain. At this occasion, a vertical line edge data is produced wherein a portion in which the vertical line edge is existent, is determined as 1, and the other portions, as 0. The horizontal position sampling circuit 70 samples out a mean value (x center of gravity) of a horizontal position (x coordinate) of every horizontal line edge existent on a horizontal line, for respective horizontal lines, a horizontal position of the vertical line edge which is at far left-hand side of the vertical line (far left point) and a horizontal position of the vertical line edge which is at far right-hand side (far right point), and preserves these data. The projection data forming circuit 11 projects the horizontal line edge data in x-direction, and produces a one-dimensional projection data wherein the size in x-direction is 1, and the size in y-direction is the screen size. The projection data 31 is produced at a rate of one per one frame. The above treatment is repeated at every constant period. The timewise data accumulating circuit 12 timewisely accumulates the projection data 31 by a predetermined number, thereby forming a two-dimensional data. The binarizing circuit 13 performs the binarizing of the two-dimensional data by the threshold value Th0. The hole-filling circuit 14 performs the hole-filling of the binary two-dimensional data. The line component element sampling circuit 15 samples out data which becomes elements of line components showing a portion of a locus of the vehicle based on the hole-filled two-dimensional data. The line component sampling circuit 16 samples out the line component by connecting the elements of the line component. The vehicle determining circuit 17 samples out the line component for the vehicle by performing a determination by a length of the line component or a position thereof on the screen. The vehicle motion detecting circuit 80 receives x center of gravity of the respective element of the line component which is determined as a vehicle from the horizontal position sampling circuit 70, and determines the vehicle as a vehicle running in the neighborhood of a center when an average value of a distance difference between the x center of gravity and a median value in the horizontal direction of the horizontal line in the existence domain wherein the x center of gravity is existent, is a threshold value Th2 or less. Conversely, when an average value of the distance difference between the x center of gravity with respect to the line component and a median value in the horizontal direction of the horizontal line in the existence domain wherein the x center of gravity is existent, is a threshold value Th3 or more, and also an average value of a distance difference between the far left point of the element and the far right point thereof, is a threshold value Th4 or less, this vehicle is determined as a vehicle running out of the existence domain, and is removed. Furthermore, when a distance difference between the x center of gravity with respect to the starting point of the line component and a median value in the horizontal direction of the horizontal line in the existence domain wherein the starting point is existent, is a threshold value Th5 or less, and a distance difference of the x center of gravity with respect to the end point of the line component and a median value in the horizontal direction of the horizontal line in the existence domain wherein the end point of the existence domain is existent, is a threshold value Th6 or more, the vehicle is determined as in a tendency of moving out of the existence domain (an abnormal running such as lane changing or obstacle evading). The vehicle information measuring circuit 18 measures a speed of the vehicle or an inter-vehicle distance between the vehicle and a foregoing vehicle, by utilizing a three-dimensional position information of the starting point and the end point of the line component which is sampled as the vehicle.

Furthermore, in the above embodiment, the determination is performed wherein the vehicle is in a tendency of moving out of the existence domain (an abnormal running such as lane changing or obstacle evading), by a positional relationship of the x centers of gravity with respect to the starting point and the end point of the line component. However, this determination can be performed by obtaining the x centers of gravity for the respective elements of the line component, and by utilizing a positional relationship between a straight line obtained by a straight line approximation of these and the existence domain.

EXAMPLE 4

Figure 9:
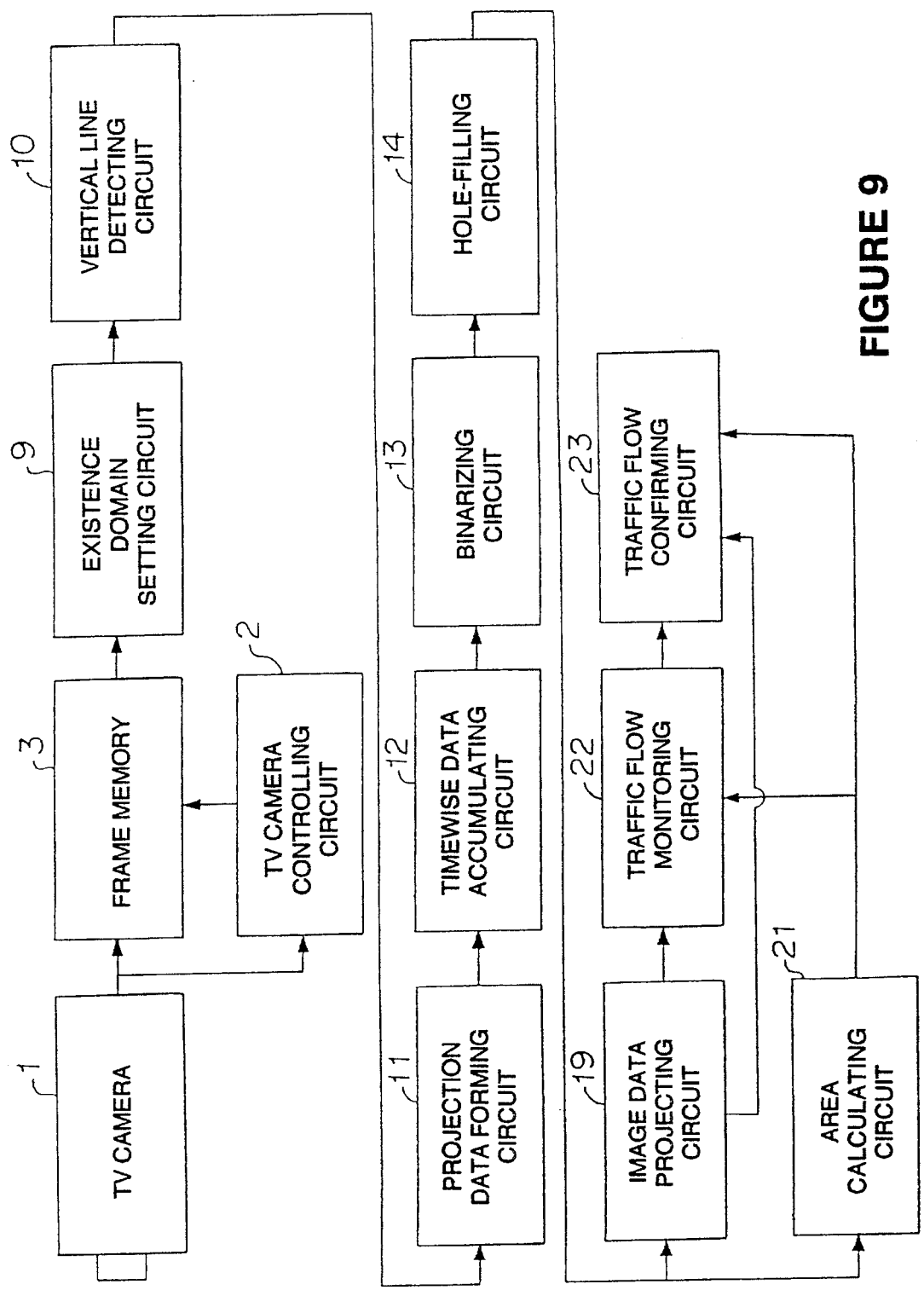
FIG. 9 is a block diagram showing a fourth embodiment of an image processing device for measuring traffic flows according to the present invention.

FIG. 9 is a block diagram showing a fourth embodiment of construction of an image processing device for traffic flows according to the present invention. In FIG. 9, a reference numeral 9 designates an existence domain setting circuit, 10, a vertical line detecting circuit, 11, a projection data forming circuit, 12, a timewise data accumulating circuit, 13, a binarizing circuit, 14, a hole-filling circuit, 19, an image data projecting circuit, 21, an area calculating circuit, 22, a traffic flow monitoring circuit, and 23, a traffic flow confirming circuit.

Next, explanation will be given to the operation. The TV camera 1 takes an image of a running vehicle at an arbitrary frame interval following the TV camera controlling circuit 2. The frame memory 3 receives data digitalized from an image signal of the TV camera 1. This data is a two-dimensional image data, and hereinafter, the horizontal direction is x-direction, and the vertical direction, y-direction. The existence domain setting circuit 9 takes out a previously set existence domain of the vehicle extended along a moving path of the vehicle from the frame memory 3. FIG. 2 is a diagram showing an example of the existence domain which is set by utilizing the existence domain setting circuit 9 on a screen in which an image of a road is taken by the TV camera, wherein a reference numeral 20 designates an existence domain.

The vertical line detecting circuit 10 takes out a vertical line edge by utilizing, for instance, a vertical line detecting filter or the like from data in the existence domain. At this occasion, a vertical line edge data is formed wherein a domain in which the vertical line edge is existent, is determined as a logic of "1", and the other domains, as a logic of "0".

The projection data forming circuit 11 projects the vertical line edge data in x-direction, and forms a one-dimensional projection data wherein the size thereof in x-direction is 1, and the size thereof in y-direction is the screen size. FIG. 3 is a diagram showing the vertical line edge data and the projection data, wherein a reference numeral 30 designates the vertical line edge data, and 31, the projection data. The projection data 31 is formed in a ratio of one per one frame.

The above treatment is repeated at every period. The timewise data accumulating circuit 12, timewisely accumulates the projection data 31 by a predetermined number, thereby forming a two-dimensional data.

The binarizing circuit 13 performs a binarizing of the two-dimensional data by a pertinent threshold value. FIG. 4 is a diagram showing the binary data, wherein the horizontal line signifies time (hereinafter, t-direction), and the vertical direction, y-direction, and reference numerals 40a and 40b, loci of the vehicle. In FIG. 4, time elapses from left to right.

In the binary data, a hole designated by a numeral 41 is generated when the vertical edge cannot be sampled by overlapping by the other vehicles or the like. The hole-filling circuit 14 performs a hole-filling of the binary data by the following treatment. The operation successively accesses the binary data in y-direction from lower side to upper side, and in t-direction from left or from right. When a condition is established wherein the reference data is a logic of "1", both of two data juxtaposed with the reference data in t-direction is determined as the logic of "1", and data above the reference data in y-direction is determined as the logic of "1". The operation performs nothing in cases of conditions other than the above one. This operation is performed for every data. FIG. 5 is an explanatory diagram of the hole-filling method, wherein a reference numeral 50 designates a portion of the binary data before the hole-filling, 51, binary data as a result of performing the above hole-filling. The hatched portion in FIG. 5 designates data of the logic of "1" of the binary data, and the other portions, data of the logic of "0".

The image data projecting circuit 19 produces a projected data by counting a number of elements of the logic of "1" in t-direction (horizontal direction) with respect to the binary data outputted by the hole-filling circuit.

The area calculating circuit 21 calculates an area by counting number of elements of the logic of "1" in the binary data outputted by the hole-filling circuit.

The traffic flow monitoring circuit 22 detects an abnormality in a timewise change of the traffic flow (unexpected incident such as an accident), by utilizing output data of the image data projecting circuit and the area calculating circuit, and issues an alarm (forecast) when the abnormality is recognized.

Figure 10:
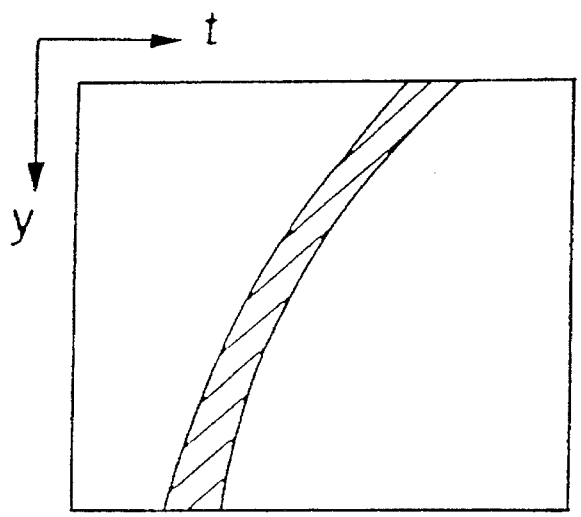
FIG. 10 is an explanatory diagram showing an example of output data of a hole-filling circuit of the fourth embodiment in case of a normal traffic flow, according to the present invention.
Figure 11:
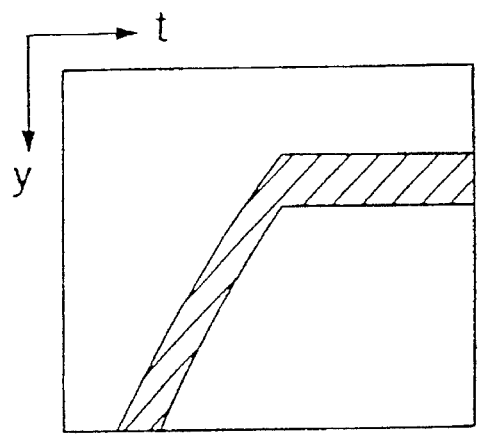
FIG. 11 is an explanatory diagram showing an example of an output data of the hole-filling circuit of the fourth embodiment in case of an abnormal traffic flow, according to the present invention.
Figure 12:
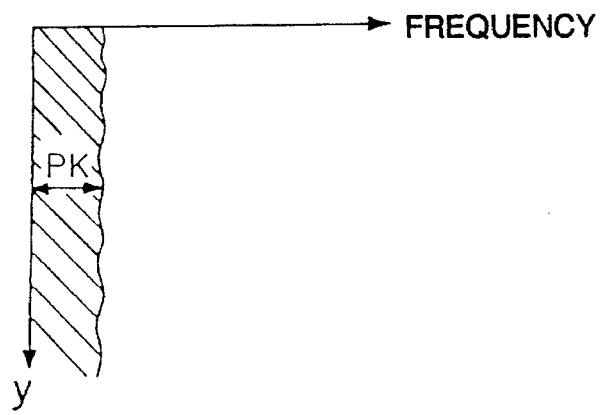
FIG. 12 is an explanatory diagram showing an example of a projected data for the output data of the hole-filling circuit of the fourth embodiment in case of the normal traffic flow, according to the present invention.
Figure 13:
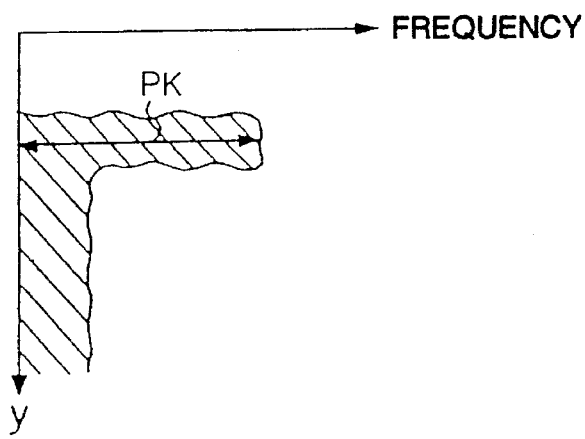
FIG. 13 is an explanatory diagram showing an example of a projected data for the output data of the hole-filling circuit in the fourth embodiment in case of the abnormal traffic flow according to the present invention.

The detection of the timewise change of the traffic flow is performed, for instance, by the following way. FIG. 10 signifies an example of the output data of the hole-filling circuit when the traffic flow is normal, and FIG. 11, another example of the output data of the hole-filling circuit when the traffic flow is abnormal (for instance, a sudden stop of the vehicle by an accident). As apparent in FIG. 11, when a vehicle suddenly stops, an information representing the vehicle (hatched portion in FIG. 11: the portion of the logic of "1" in the embodiment) is rapidly bent to the horizontal direction. Next, examples of outputs of the image data projecting circuit are shown in FIGS. 12 and 13. FIG. 12 is a projected data with respect to FIG. 10, and FIG. 13, a projected data with respect to FIG. 11. In these Figures, PK designates a maximum value of the projected data. The detection of the abnormality of the traffic flow is performed by the following equation by utilizing a property wherein the maximum value PK of the projected data is increased when the traffic flow is abnormal.

$$PK/S \geq TH1 \quad (1)$$

When the above equation is satisfied, an alarm (forecast) is issued as the traffic flow being abnormal.

In equation (1), S is an area (output data of the area calculating circuit), and TH1, a pertinent constant.

The traffic flow confirming circuit 23 performs further abnormality detection of the traffic flow by utilizing the output data of the image data projecting circuit and the area calculating circuit in case that an alarm (forecast) is issued, and issues a secondary alarm when the abnormality is still recognized.

Figure 17:
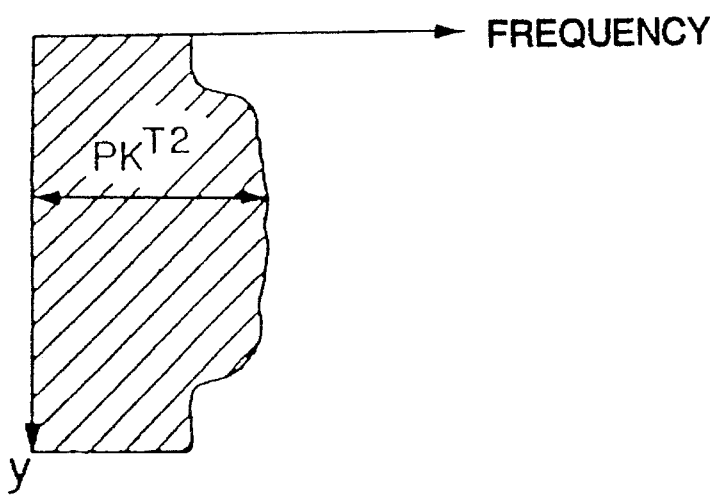
FIG. 17 is an explanatory diagram showing an example of a projected data for an output data of the hole-filling circuit of the embodiment 4, in case that a traffic jam is caused, according to the present invention.
Figure 14:
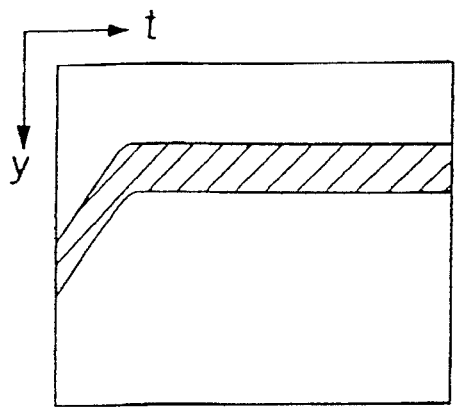
FIG. 14 is an explanatory diagram of an example of an output data of the hole-filling circuit of the fourth embodiment in case that a stopped vehicle continues stopping, according to the present invention.
Figure 15:
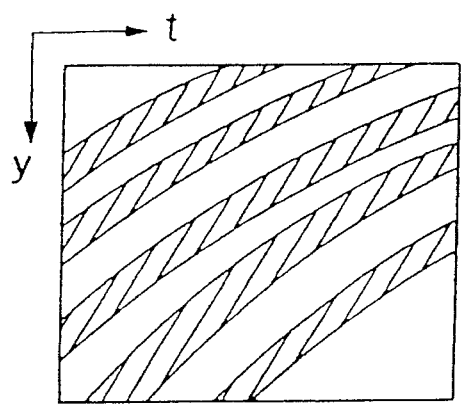
FIG. 15 is an explanatory diagram showing an example of an output data of the hole-filling circuit of the fourth embodiment in case that a traffic jam is caused, according to the present invention.
Figure 16:
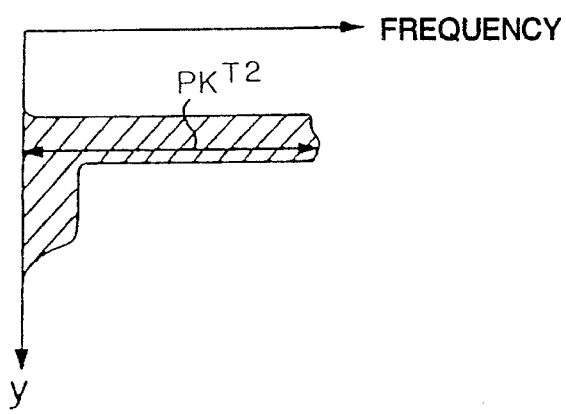
FIG. 16 is an explanatory diagram showing an example of a projected data for the output data of the hole-filling circuit of the fourth embodiment in case that a stopped car continues stopping, according to the present invention.

FIG. 14 is a diagram showing an example of the output data of the hole-filling circuit when a stopped vehicle continues stopping by itself, and FIG. 15, an example of the output data of the hole-filling circuit in case that a traffic jam is caused by an accident or the like. FIGS. 16 and 17 respectively show the projected data of FIGS. 14 and 15. The data described in FIGS. 14, 15, 16 and 17, show data wherein a certain time interval elapses timewisely from a situation which is shown in the explanation of the operation of the traffic flow monitoring circuit. The detection of the abnormality of the traffic flow is performed by the following equation (2) by utilizing a property wherein the maximum value PK of the projected data shows a large value in case that, after the alarm (forecast) is issued, the stopped vehicle is still existent, or the area is enlarged when a traffic jam is caused by the stopped vehicle.

$$PK^{T2}/S^{T2} \geq TH2, \text{ or } S^{T2}/S^{T1} \geq TH3 \quad (2)$$

When the above equation (2) is satisfied, a secondary alarm is issued as the traffic flow being abnormal.

In equation (2), $PK^{T2}$ and $S^{T2}$ respectively show the maximum value and the area of the projected data at the time point of T2, $S^{T1}$, the area at the time point of T1, and T2 is timewisely delayed compared with T1. Furthermore, TH2 and TH3 are pertinent constants.

In the above example, the area calculating circuit 21 is provided after the hole-filling circuit 14. However, it may be provided between the binarizing circuit 13 and the hole-filling circuit 14.

Furthermore, the above explanation concerns with the case wherein this invention is utilized in measuring the traffic flows. However, naturally, the invention can be utilized in measuring the other moving bodies.

EXAMPLE 5

Figure 18:
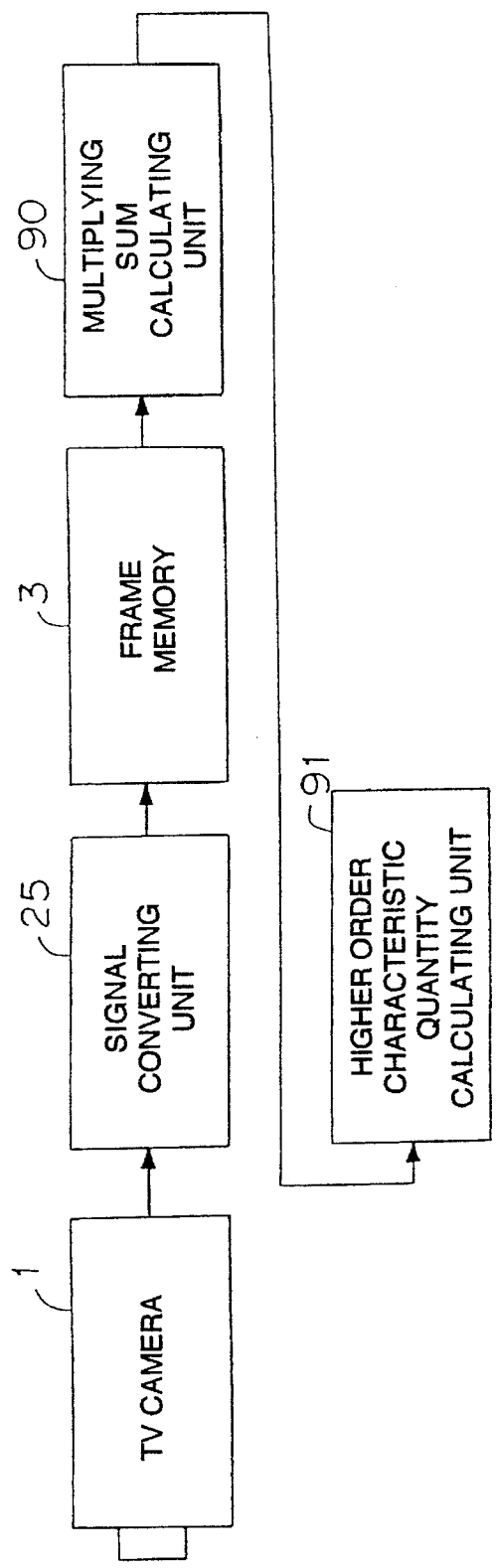
FIG. 18 is a block diagram showing the fifth embodiment of a moving body detecting device, according to the present invention.

Explanation will be given to the fifth embodiment of the present invention referring to the following Figures. FIG. 18 is a block diagram showing construction of a moving body detecting device of this invention. In FIG. 18, a reference numeral 3 designates a frame memory for recording a gray level value which is numerically converted by a signal converting unit 25, as for a plurality of frames, to an address corresponding with a space-time coordinate, 90, a multiplying sum calculating unit which performs a multiplying sum calculation, with respect to the respective points memorized in the frame memory, between a plurality of the gray level values with respect to timewise and spatial vicinities and a plurality of previously set constant-valued weight coefficients, 91, a higher order characteristic quantity calculating unit for sampling further a higher order characteristic quantity of the moving body (for instance, a speed of the moving body etc.) by utilizing result values of the multiplying sum calculation with respect to the respective points calculated by the multiplying sum calculation unit 90.

Next, explanation will be given to the operation.

The image signal received from the TV camera 1, is digitized for the respective frames at an arbitrary frame interval by the signal converting unit 25, and successively stored in an address corresponding with the space-time coordinate of the frame memory 3, as for a plurality of frames. In this embodiment, at a certain time point, preceding N frames are stored in an address corresponding with an arrangement in the frame memory $I(x,y,t)$ (x=1 to X, y=1 to Y, t=1 to T). The multiplying sum calculating unit 90 reads out weight coefficients from a previously set weight coefficient arrangement W(K,L,N) (X>K, Y>L, T>N), performs the multiplying sum calculation with respect to the respective spatial coordinates, by K×L×N times by the following equation (3), and stores the result at O(x,y,t).

$$O(x,y,t) = \sum_{k=-K/2}^{K/2} \sum_{l=-L/2}^{L/2} \sum_{n=1}^{N} I(x+k, y+l, t+n) W(k,l,n) \quad (3)$$

For instance, when K=L=N=3 and l=2, assuming w as a partial arrangement of W, and W(k,2,n) in equation (3) is the following equation (4), all of the other arrangement elements of W being 0, an absolute value of O(x,y,t) changes with a change quantity, when a considerable brightness change is generated in a dot array arranged in the horizontal direction of a space coordinate (x,y) at time $t_O$ (a step difference of the gray level value is generated in the direction of the time axis).

$$W(k,2,n) \equiv w(k,n) = \begin{pmatrix} 1, & 2, & 1 \\ 0, & 0, & 0 \\ -1, & -2, & -1 \end{pmatrix} \quad (4)$$

Furthermore, when K=L=N=3 and k=2, assuming w' as a partial arrangement of W, and when W(2,l,n) of equation (3) is the following equation (5), all of the other arrangement elements W being 0, an absolute value of O(x,y,t) changes with a change quantity, when a considerable brightness change is generated in a dot array arranged in the vertical direction of the space coordinate (x,y) at time $t_O$ (a step difference of the gray level value is generated in the direction of time axis).

$$W(2,l,n) \equiv w'(l,n) = \begin{pmatrix} 1, & 2, & 1 \\ 0, & 0, & 0 \\ -1, & -2, & -1 \end{pmatrix} \quad (5)$$

As a singular example, when K=L=N=3 and n=2, assuming w" as a partial arrangement of W, and when W(k,l,2) of equation 3 is the following equation (6), all of the other arrangement elements of W being 0, an absolute value of O(x,y,t) changes with a change quantity, when a considerable brightness change is generated in a dot array arranged in the horizontal direction of the space coordinate (x,y) at time $t_O$ (a step difference of gray level value is generated in the spatial direction of y axis). Accordingly, it becomes a publicly known SOBEL operator as a spatial differential filter in the vertical direction.

$$W(k,l,2) \equiv w''(k,l) = \begin{pmatrix} 1, & 2, & 1 \\ 0, & 0, & 0 \\ -1, & -2, & -1 \end{pmatrix} \quad (6)$$

As for the weight coefficients, an example has been shown wherein only partial arrangements orthogonal to the respective axes have values other than 0 in the above Example. However, various space-time differential (difference) quantities can be obtained by giving arbitrary values to arbitrary elements of K×L×N. When the elements of the weight coefficient W have values of 0, it is self-evident that a high-speed operation can be attained by dispensing with a reading-out operation and the multiplying sum calculation.

In order to perform the above calculation for detecting the moving body, detecting a timewise change of the gray level values caused by the moving of the moving body, which is insensitive of the spatial change of the gray level value in a stational background, is required. Therefore, a space-time characteristic is sampled out by information of a change of the gray level signifying the vehicle in the screen image by pertinently combining the results O and O' which are obtained by the respective Ws composed by the above w and w'.

Specifically, existence or nonexistence of the moving body is determined by obtaining a summation of absolute values of O(x,y,t) and O'(x,y,t) for the respective coordinates, and by performing a pertinent threshold value determination.

The higher order characteristic calculating unit 91 performs grouping and labelling on the existence or nonexistence result of the moving body for the respective coordinates detected by the multiplying sum calculating unit 90, and samples out a higher order information such as speeds of the respective moving bodies etc. by a combination or the like thereof with a result at a preceding time.

EXAMPLE 6

Furthermore, in the above fifth embodiment, explanation has been given to an Example with respect to a vicinity domain of 3×3×3, when the multiplying sum calculation is performed between a plurality of gray level values at a plurality of the vicinities of the timepoints and the space thereof, and a previously set plurality of constant-valued weight coefficient, with respect to the respective points memorized in the frame memory 3. However, as the equation signifies, K, L and N may be arbitrary positive numbers. Furthermore, the weight coefficients are shown, in the above Example, in a form wherein SOBEL operator (primary differentiation) is applied in the space-time. However, these weight coefficients may be of arbitrary values such as a secondary differentiating operator (Laplacian operator, etc.), with effects corresponding with the respective values.

EXAMPLE 7

In the above Examples, the result is utilized which is obtained by the respective Ws composed by w and w'. However, it is possible to sample out a space-time characteristic from information of the change of the gray level, by pertinently combining the output results Os of arbitrary Ws, which can be utilized for various usages.

EXAMPLE 8

In the above Examples 5 through 7, the space-time characteristic of O(x,y,t) and O'(x',y',t') and the like for the respective coordinates sampled out by the multiplying sum calculation, by the multiplying sum calculating unit 90, is composed, so that it performs the existence or nonexistence determination of the moving body directly by the determination of the threshold value of the sum of the absolute value. However, it can be composed so that it performs the determination of the existence or nonexistence of the moving body by temporarily accumulating the multiplying sum calculation value to another frame memory and by determining characteristics of timewise changes thereof with respect to the respective spatial coordinates.

Figure 19:
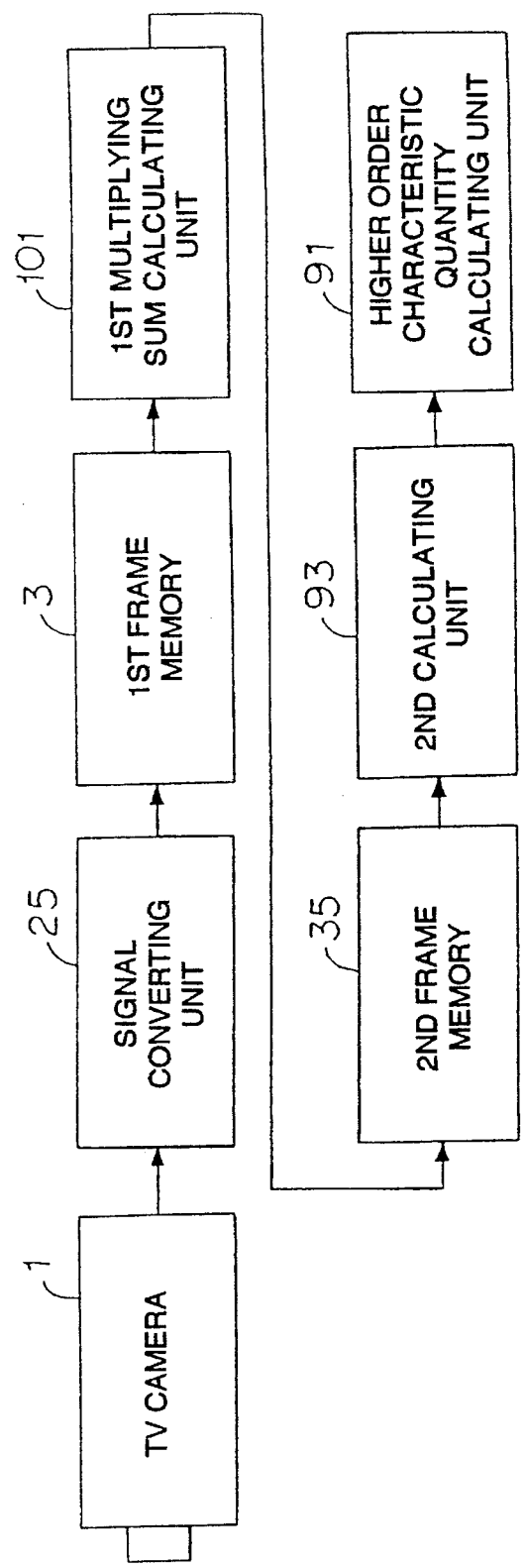
FIG. 19 is a block diagram showing the eighth embodiment of a moving body detecting device, according to the present invention.
Figure 20:
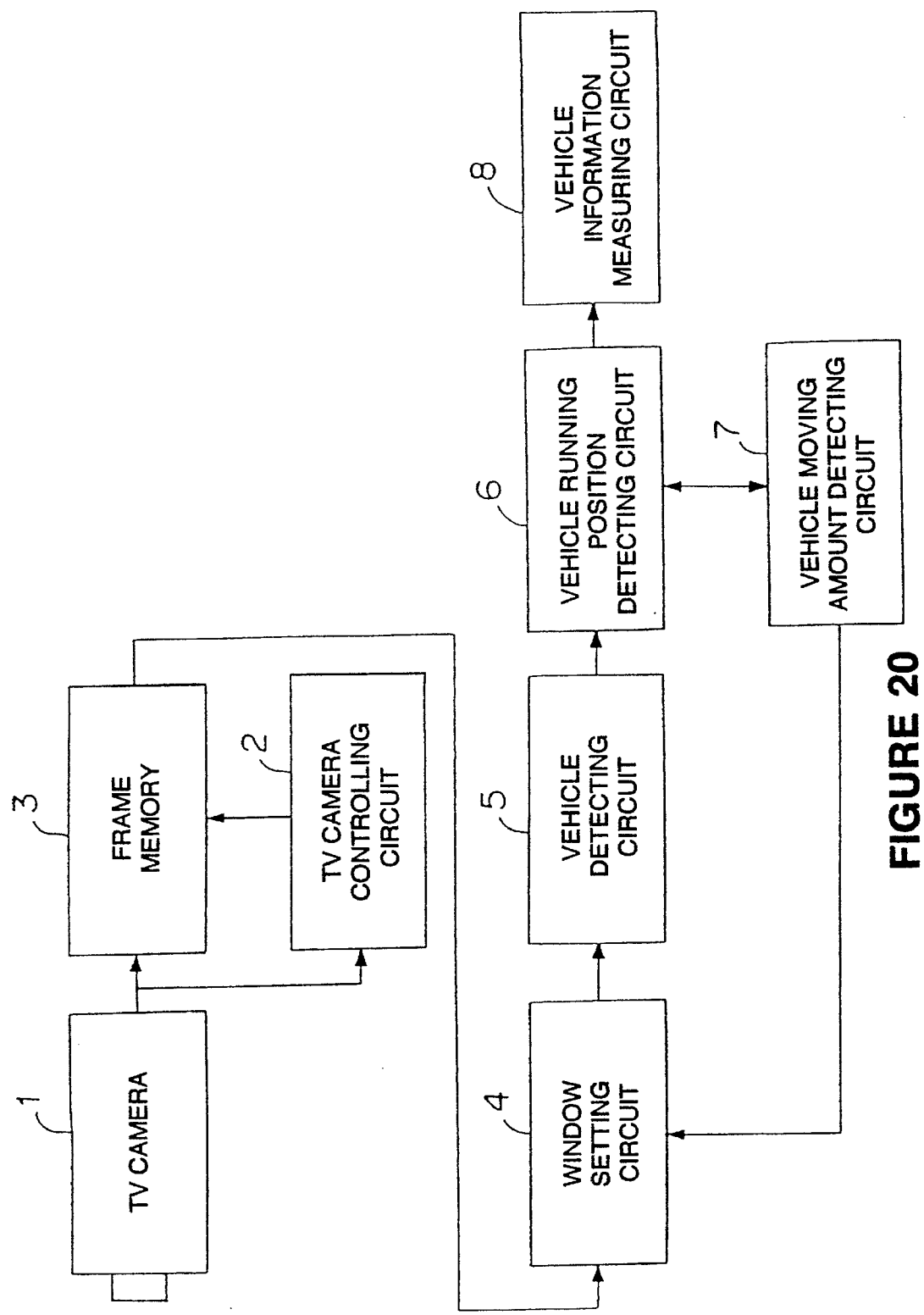
FIG. 20 is a block diagram showing a conventional moving body detecting device.

FIG. 19 is a block diagram showing the composition of such Example, wherein reference numerals 1, 25, 3 and 91 signify the same with those in the above Example. For instance, when W is shown by equation (4), a first multiplying sum calculating unit 101 performs only the multiplying sum calculation of equation (3), and writes the calculation result into a second frame memory 35. In a second calculating unit 93, when an output value row of the first calculating unit 101 at a certain spatial coordinate (a,b), is inputted to the second calculating unit through a second frame memory 35 as follows, $O(a,b,t0)$

.
.
.

$O(a,b,tn-1)$
$O(a,btn)$
$O(a,b,tn+1)$,

.
.
.

As shown in the following equation (7), attention is given to the successive three frames in the direction of time axis in a timewise series which is read out by the second frame memory 35. An output value P is composed to output the determination output wherein a threshold value determination is performed by a pertinent threshold value, in a certain spatial coordinate, at a position, in an intermediate frame time point wherein the value thereof is changed from + to − or − to +.

When $O(a,b,tn-1) \times O(a,b,tn+1) < 0$, (7)
$P(a,b,tn) = (|O(a,b,tn-1)| + |O(a,b,tn+1)|) \times 1/2$,
When $O(a,b,tn-1) \times O(a,b,tn+1) \geq 0$,
$P(a,b,tn) = 0$

EXAMPLE 9

Furthermore, the above Example 8 is composed so that the existence or nonexistence determination of the moving body on the spatial coordinate is made only by an output of the second calculating unit 93. However, it is possible to sample out the space-time characteristic from information of the change of the gray level, by pertinently combining an intermediate output value P of the second calculating unit 93 with an arbitrary output value of 0 in the above Examples 5 through 8, at an arbitrary time, which can be utilized for various usages.

As stated above, according to the first and the eighth inventions, since the referring of the moving body between frames for tracking, is not necessary, the construction is simple and the vehicle can be sampled out even when the vehicle information is dropped off in a portion of frames, a moving body measuring device or an image processing device for traffic flows can be provided wherein the measuring accuracy is high and the detection of a plurality of moving bodies simultaneously existent in the screen becomes possible.

The second and the ninth inventions have an effect of promoting the detecting accuracy of the moving body by performing efficiently the hole-filling with respect to the data which are produced by the timewise data accumulating means described in the first and the eighth inventions.

The third and the tenth inventions can realize a high-speed operation by efficiently performing the sampling out of the line component elements with respect to the data produced by the timewise data accumulating means described in the first and the eighth inventions, or with respect to the data hole-filled by the hole-filling means of the second and the ninth inventions.

The thirteenth invention has an effect of promoting the sampling accuracy of the vehicle.

The fourteenth invention has an effect of widening an application range of the image processing device for traffic flows, since detection of the behavior of the vehicle becomes possible.

Furthermore, since the moving body measuring device of the fourth, the fifth, the eleventh and twelfth inventions, can perform a mapping of information of a plurality of moving bodies or moving vehicles which are obtained by the image taking unit such as a TV camera, as binary image data, on a time versus moving distance plane, a complicated treatment such as the referring or the tracking of the moving body or the moving vehicles between frames, is not necessary. The measuring accuracy can be promoted since a dropped-out information can be compensated by a simple binary image processing even when a portion of the information of the moving bodies or moving vehicles is dropped off by influence of noise or the other vehicles. The device can perform the measurement of a plurality of moving bodies or moving vehicles. Since the device can perform a confirmation treatment of the detection of the abnormality of a flow of a moving body, or the traffic flow, the promotion of the accuracy can be achieved.

Furthermore, as stated above, the sixth invention is composed of an image taking unit for taking an image of a moving body, a signal converting unit for converting the image signal from the image taking unit into a numeral value corresponding with the gray level, a frame memory for recording the gray level value to an address corresponding with a space-time coordinate in a plurality of successive scenes, and a calculating unit for detecting existence or nonexistence of the moving body by performing a multiplying sum calculation between a plurality of gray level values at a plurality of the timewise and spatial vicinities, and a previously set plurality of constant-valued weight coefficients, with respect to the respective points memorized in this frame memory. Therefore, the detection of the moving body which is conventionally performed by sampling out only the characteristic of the change of the spatial gray level of the vehicle or the like on the screen such as a horizontal line or a vertical line, can be replaced with a very accurate detection of the moving body, by detecting a timewise change of the gray level value of the moving body by the moving per se, which is insensitive to a spatial change of the gray level value in a stationary background.

Furthermore, the seventh invention is composed of an image taking unit for taking an image of a moving body, a signal converting unit for taking in the image signal from the image taking unit which is converted to a numerical value corresponding with the gray level, the first frame memory for recording the gray level value at an address corresponding with a space-time coordinate in a plurality of successive scenes including before and after the time for attention, the first calculating unit for detecting a timewise change ratio of a spatial gray level value by performing a multiplying sum calculation between a plurality of gray level values in the vicinity concerning time and space and a previously set plurality of constant-valued weight coefficients, with respect to the respective points stored in the first memory, the second frame memory separately provided for recording the output results of the first calculating unit in a plurality of successive scenes, at an address corresponding with the space-time coordinate, and the second calculating unit for detecting the existence or nonexistence of the moving body by a change of the output values at the same spatial coordinate corresponding with a plurality of time points of the second frame memory. Therefore, a more accurate detection of the moving body becomes possible.

What is claimed is:

1. An image processing device for measuring traffic flows which comprises:

means for taking an image;

a frame memory for storing a plurality of image data elements that define the image;

means for selecting a set of image data elements from the plurality of image data elements, the selected set of image data elements being indicative of a portion of the image within an existence domain, the existence domain defining an intended vehicle path in the image;

means for selecting vehicle data representing potential vehicles front the set of image data elements, the vehicle data defining line edges;

means for generating information that defines one of a center of gravity value and a width based upon the vehicle data defining the line edges, and preserving the information;

means for selecting projection data from the vehicle data based on the information from the means for generating and preserving;

means for timewisely accumulating the projection data selected by the means for selecting the projection data;

means for determining the existence of a vehicle moving in the portion of the image within the existence domain based on the timewisely accumulated projection data; and a state quantities measuring device for measuring state quantities of the vehicle determined by the means for determining.

2. The device of claim 1, further comprising:

a binarizing circuit for receiving the timewisely accumulated projection data and, for forming a two-dimensional locus of values indicating timewise movement of the vehicle along an axis of the image.

3. The device of claim 2, wherein the two-dimensional locus of values defines a curve having at least one hole in the curve, and wherein the device further comprises:

a hole-filling circuit that recognizes the at least one hole in the curve defined by the two-dimensional locus, and adjusts the two-dimensional locus so that the two-dimensional locus defines a solid curve.

4. The device of claim 1, wherein the line edges defined by the vehicle data are vertical line edges, wherein the information includes the center of gravity value, and wherein the means for selecting the projection data includes:

means for selecting a horizontal axis through the image along which to project the vehicle data when the center of gravity value is within a predetermined range.

5. The device of claim 1, wherein the line edges defined by the vehicle data are vertical line edges, wherein the information includes the width, and wherein the means for selecting the projection data includes:

means for selecting a horizontal axis through the image along which to project the vehicle data when the width exceeds a predetermined value.

6. An apparatus for detecting an existence of a moving vehicle in an image, comprising:

a storage device that receives and stores a set of image data elements defining the image;

a vehicle data detecting circuit coupled to the storage device, that provides vehicle data representing potential vehicles in the image based on the set of image data elements, the vehicle data defining a set of edges;

an information generating circuit coupled to the vehicle data detecting circuit, that generates information that defines one of a center of gravity value and a width based on the vehicle data defining the set of edges;

a projection circuit coupled to the information generating circuit, that provides a set of projection data elements from the vehicle data according to the information;

an accumulating circuit that, over time, accumulates a plurality of sets of projection data elements provided by the projection circuit; and determining circuitry coupled to the projection circuit, that determines the existence of a moving vehicle in the image according to the plurality of sets of projection data elements.

7. The apparatus of claim 6, wherein the determining circuit includes:

a binarizing circuit that generates a two-dimensional array of binary values according to the plurality of sets of projection data elements; and a vehicle determining circuit that provides an output signal indicating the existence of the moving vehicle in the image when the two-dimensional array defines a curve.

8. The apparatus of claim 7, wherein the output signal provided by the vehicle determining circuit indicates the existence of a moving vehicle in the image for each curve defined by the two-dimensional array.

9. The apparatus of claim 7, wherein the determining circuitry further includes:

a hole filling circuit that modifies the two-dimensional array to define solid curves when the two-dimension array initially defined curves having holes.

10. The apparatus of claim 6, wherein the projection circuit includes:

selection circuitry that selects a horizontal axis through the image along which to project the vehicle data.

11. The apparatus of claim 10, wherein the information includes the center of gravity value, and wherein the selection circuitry includes:

circuitry that selects the horizontal axis when the center of gravity value is within a predetermined range.

12. The apparatus of claim 10, wherein the information includes the width, and wherein the selection circuitry includes:

circuitry that selects the horizontal axis when the width exceeds a predetermined threshold.

13. A method for detecting an existence of a moving vehicle in an image, comprising the steps of:

receiving a set of image data elements defining the image;

generating vehicle data representing potential vehicles in the image based on the set of image data elements, the vehicle data defining a set of edges;

generating information that defines one of a center of gravity value and a width based on the generated vehicle data defining the set of edges;

forming a set of projection data elements from the generated vehicle data according to the generated information;

accumulating, over time, a plurality of sets of projection data elements; and determining the existence of a moving vehicle in the image according to the plurality of sets of projection data elements.

14. The method of claim 13, wherein the step of determining includes the steps of:

generating a two-dimensional array of binary values according to the plurality of sets of projection data elements; and providing an output signal indicating the existence of the moving vehicle in the image when the two-dimensional array defines a curve.

15. The method of claim 14, wherein the output signal provided by the vehicle determining circuit indicates the existence of a moving vehicle in the image for each curve defined by the two-dimensional array.

16. The method of claim 14, wherein the step of determining further includes a step of modifying the two-dimensional array to define solid curves when the two-dimension array initially defined curves having holes.

17. The method of claim 13, wherein the step of forming includes a step of selecting a horizontal axis through the image along which to project the vehicle data.

18. The method of claim 17, wherein the information includes the center of gravity value, and wherein the step of selecting includes a step of selecting the horizontal axis when the center of gravity value is within a predetermined range.

19. The method of claim 17, wherein the information based on the vehicle data includes the width, and wherein the step of selecting includes a step of selecting the horizontal axis when the width exceeds a predetermined threshold.

* * * * *